March 21, 1939. K. W. HOUSE 2,151,598
THEFTPROOF LICENSE PLATE AND HOLDER THEREFOR
Original Filed May 11, 1937 2 Sheets-Sheet 1
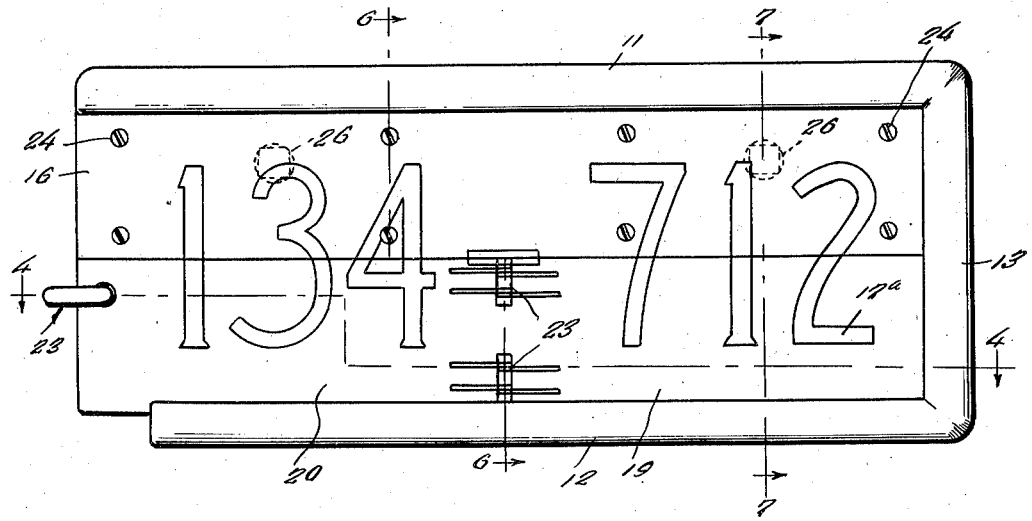
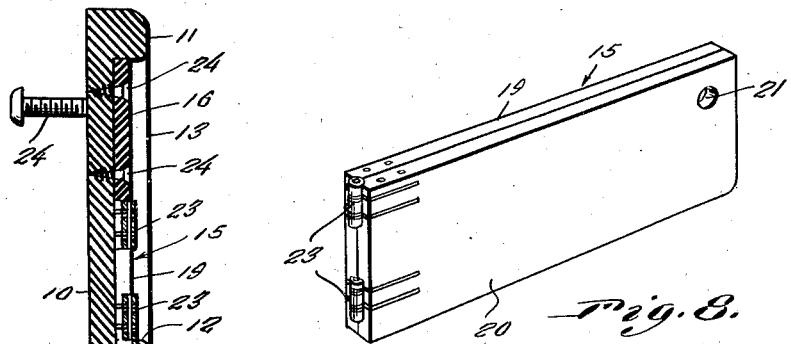
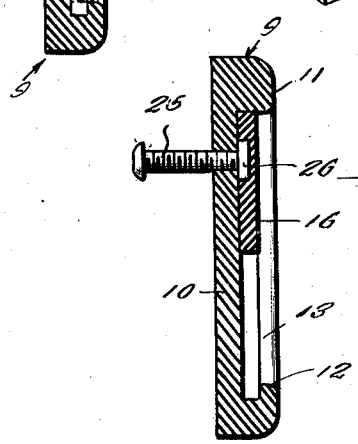
Inventor
K. W. House
By Clarence A. O'Brien
Hyman Berman
Attorneys March 21, 1939.  K. W. HOUSE  2,151,598
THEFTPROOF LICENSE PLATE AND HOLDER THEREFOR
Original Filed May 11, 1937  2 Sheets-Sheet 2
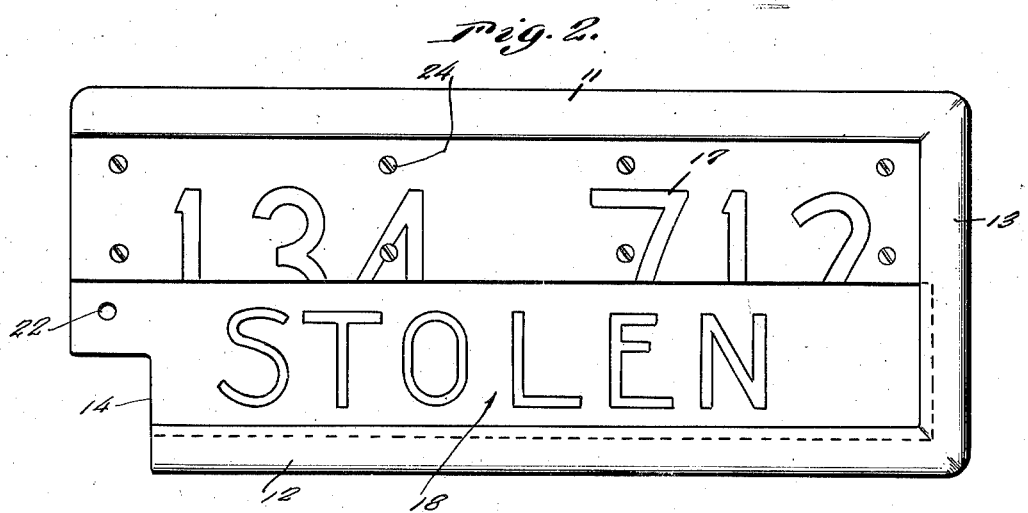
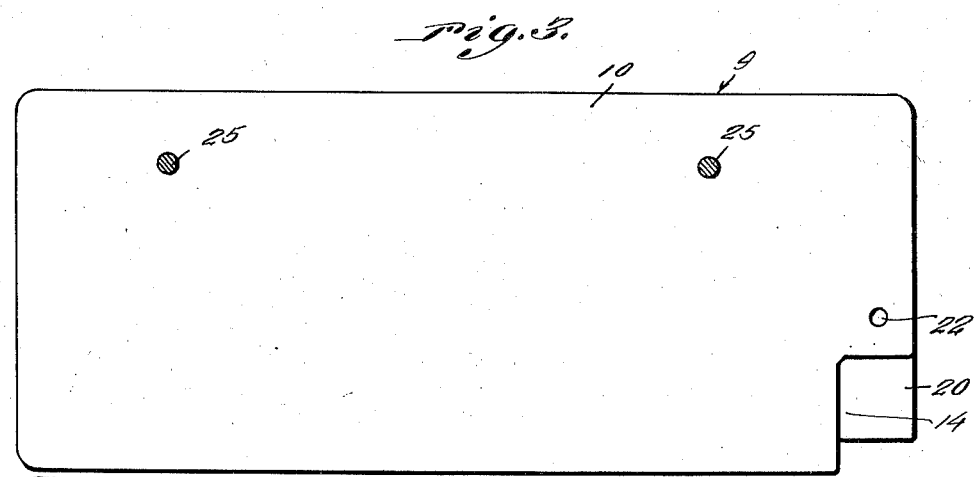
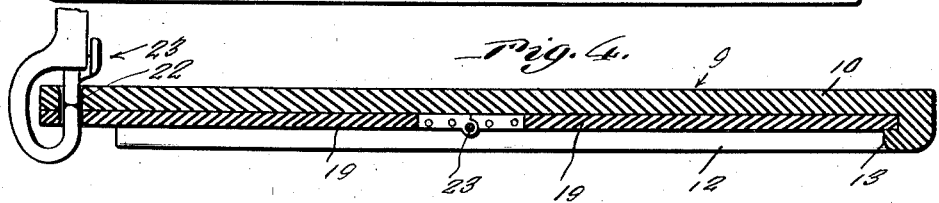
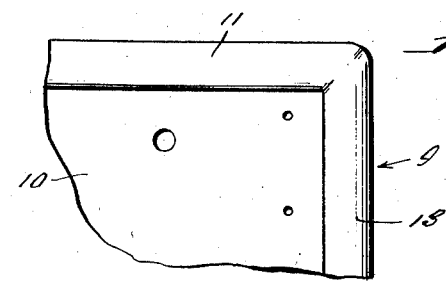

Patented Mar. 21, 1939

2,151,598

UNITED STATES PATENT OFFICE 2,151,598

THEFTPROOF LICENSE PLATE AND HOLDER THEREFOR

Karl W. House, Oatman, Ariz.

Application May 11, 1937, Serial No. 142,026
Renewed August 17, 1938

5 Claims. (Cl. 40—2.2)

The invention herein shown and specifically described covers a safety-type, theft-proof license plate and especially designed holder therefor, the complete assemblage being adapted for use on present day automobiles and similar vehicles.

By way of introduction and explanation, it is to be pointed out that the subject matter of this application for patent has definite companionate and structural relation to a copending application for a so-called theft-proof license plate, identified as Serial No. 134,860, filed April 3, 1937, by me, of which this application is a continuation in part.

Briefly, there is generic structural likeness between the prior invention and the one hereinafter described with particularity. That is to say, novelty is predicated upon a license plate holder characterized by a backing plate having a retaining rim, a license plate composed of upper and lower companion half-sections, the upper half-section being fitted into the rim of the holder, the lower half-section being slidably mounted in the rim, retaining means being provided for the lower slidable section, and both sections being provided with coordinated part-numerals to forestall transfer and stealing of license tags and plates.

By way of contrast, an appreciable improvement and feature of refinement exemplified in the invention here under consideration is a holder and sectional tag or plate construction wherein the three parts are preferably constructed of rubber, whereby to render the structure substantially indestructible, to avoid bending and disfiguration, and to thereby prolong and maintain the holder and tag in good condition for an indefinite period of time.

By far the outstanding improvement is devoted to the sectional license plate construction wherein one section is fixed and adequately secured in place, and the other section being removable and held in place by a simple snap fastener, the removable or detachable section being composed of the hingedly joined portions, whereby to permit said section to be conveniently folded into a compact package to be readily carried in one's pocket after the car is temporarily parked.

Other features and advantages of the invention will become more readily apparent from the following description and the accompanying drawings.

In the drawings:

Figure 1 is an elevational view of the complete assemblage including the holder and sectional license plate, the parts being constructed specifically in accordance with the preferred embodiment of the inventive concept.

Figure 2 is a view like Figure 1 with the detachable foldable plate section removed to expose the word "Stolen" to facilitate tracking down automobile thieves.

Figure 3 is what may be called an elevation of the reverse side of the structure seen in Figure 1.

Figure 4 is a horizontal section on the irregular line 4—4 of Figure 1.

Figure 5 is a fragmentary view of one corner portion of the holder.

Figure 6 is a transverse or vertical sectional view taken on the irregular line 6—6 of Figure 1.

Figure 7 is also a transverse vertical section on the line 7—7 of Figure 1, the removable plate section having been withdrawn.

Figure 8 is a perspective view of the foldable section of the two-part license plate.

Referring now to the drawings by distinguishing reference numerals, it will be observed that the holder, as a unit, is denoted by the numeral 9. As before indicated, this is fashioned to accommodate the sectional license plate and all three parts are composed of rubber of an appropriate texture and thickness to adapt said features for adequate commercial utility. The holder comprises a substantially rectangular backing plate 10 and a surrounding marginal retention rim which includes longitudinal members 11 and 12 joined at one end by a transverse connecting member 13. This leaves the left hand end of the holder open, as evident from Figure 2. At this end I provide a finger notch 14 to facilitate convenient access to the removable foldable section 15 of the two-part license plate. The second part or section of the plate is distinguished by the numeral 16. This is substantially rectangular or longitudinally elongated in form and slipped into the holder fitting into the members 11 and 13 of the surrounding rim. It is provided with half-numerals or indicating numbers denoted by the characters 17. This section 16 is rigidly secured in place and, as evident from Figure 2, serves to expose the insignia or signal "Stolen", as indicated by the numeral 18, that is, when the removable section 15 has been slipped out.

The last-named section 15 is, as before indicated, foldable. That is to say, it is made up of companion portions or features 19 and 20, the feature 20 having an aperture or hole 21 to register with an associated hole 22 in the holder whereby to accommodate easily usable snap fasteners 23. The two sections 19 and 20 are hingedly connected as at 23 by what may be called a conventional rule joint. It follows that when the section 15 is removed, the parts can be folded into overlapping relationship to provide a body sufficiently small to be carried in one's coat pocket.

When the removable part 15 is in place, it obviously covers the word "Stolen". Moreover, the outer end of the hinged portion 20 extends out and beyond the clearance or finger notch 14 where it projects a distance sufficient to permit it to be conveniently grasped and slipped out, as is evident from Figure 3.

The relatively stationary or fixed section 16 of the plate is primarily held in the holder through the instrumentality of a multiplicity of screws or equivalent fasteners 24. The headed attaching bolts 25, seen in Figure 7, have their shank portions extending through the backing plate and anchored in nuts 26 fitted snugly in cavities or pockets formed in what may be called the inner side or face of the plate section 16. Thus, in order to detach the holder from the supporting bracket (not shown), it is necessary to get access to these nuts 26. In order to obtain access to the nuts 26, it is necessary to remove all eight of the fastenings 24. The purpose of this is to make it as inconvenient as possible for a thief to take out the two sections 15 and 16 for transfer to some other car.

With the device ready for use, as seen in Figure 1, it is evident that the slidable foldable section 15 is temporarily held in the holder by way of the readily available, easily usable snap fastener device 23. At this time the portions of the license numbers 17a on the section 15 coordinate with those, 17, on the section 16, whereby to provide the complete license number for regulation use. In accordance with my conception, when the car is parked, the driver slips the removable section 15 out of the holder. This exposes the word "Stolen" 18, as seen in Figure 2. Then the companion parts 19 and 20 are folded into overlapping relation, as shown in Figure 8, making a compact article susceptible of being easily carried in one's pocket. It follows that the principal idea is to have a holder with the upper part of the tag containing a part of the number and the lower removable part having the associated features of the number, said lower part being removable to expose the signal or warning that the car is being driven by an unauthorized person.

Other features and advantages have doubtless become apparent by comparing the subject matter of this application with the copending application Serial No. 134,860, specified in the introductory portion of the application.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a construction of the class described, a license plate holder comprising a backing plate and a marginal retaining rim, a license plate composed of upper and lower companion half-sections, the upper half-section being rigidly fitted into the rim, the lower half-section being slidably mounted in said rim, said lower section being formed of hingedly connected complemental portions in the manner and for the purposes described.

2. In a structure of the class described, a license plate construction including a holder having a backing plate provided with a marginal retaining rim, the lower portion of said backing plate having displayed on the visible side thereof the word "Stolen", a sectional license plate mounted in said holder and including upper and lower companion sections, the upper section being fitted against the backing plate and held rigidly in the rim portion thereof in such a way as to expose the word "Stolen", said lower section being removably fitted in the surrounding portion of said rim and normally covering said word "Stolen", said removable section being composed of hingedly joined foldable portions in the manner and for the purposes described.

3. In a construction of the class described, a license plate holder comprising a backing plate and a retaining rim, a license plate composed of upper and lower companion half-sections, the upper half-section being fitted into the rim rigidly, the lower half-section being slidably mounted in said rim, retaining means for said lower slidable section, both sections being provided with split numerals operable in the manner and for the purposes described.

4. As a new product of manufacture, a license plate construction comprising a holder including a backing plate having a marginal retaining rim, the lower portion of said backing plate having displayed on the front or visible side thereof the word "Stolen", a sectional license plate mounted in said holder and including upper and lower companion sections, the upper section being fitted against the backing plate and held in the rim rigidly in a manner to completely expose the word "Stolen", said lower section being removably fitted in the surrounding portion of the rim and normally covering said word and serving to bring the word to definite display position when said lower section is removed by hand when leaving the car parked.

5. In a license plate construction of the class described, a holder comprising a backing plate having a marginal retaining rim, said rim including spaced parallel longitudinal top and bottom flanges adjoined at one end by a transverse connecting flange leaving said holder open at one end, one corner portion of the backing plate at said open end being notched, and a sectional license plate, the sections thereof being fitted into said triple-part rim and disposed in contact against the backing plate, one section being rigidly mounted and the other section being removably mounted, the last-named section having one end portion projecting for coaction with said notch, whereby to render said projecting end readily available.

KARL W. HOUSE.